INVENTOR.
ARTHUR L. ROSSOFF

April 23, 1968     A. L. ROSSOFF     3,379,827
SYNTHETIC STEREOSCOPIC BINOCULAR
Filed July 26, 1963     6 Sheets-Sheet 2
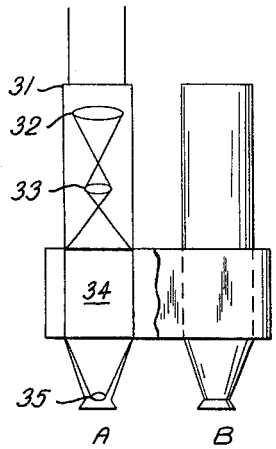
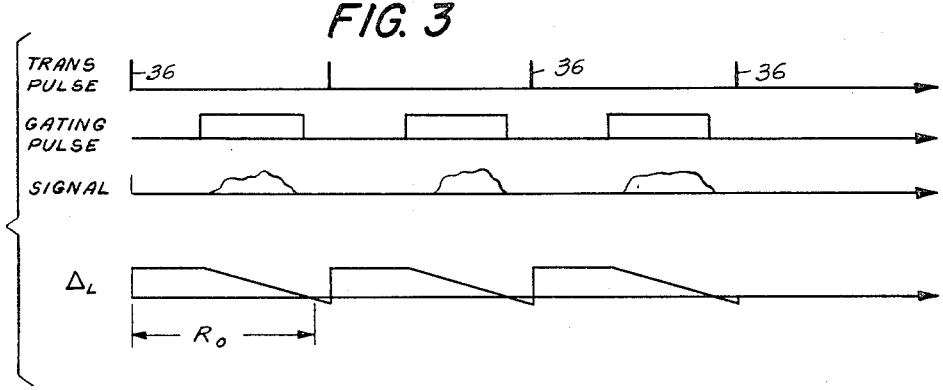
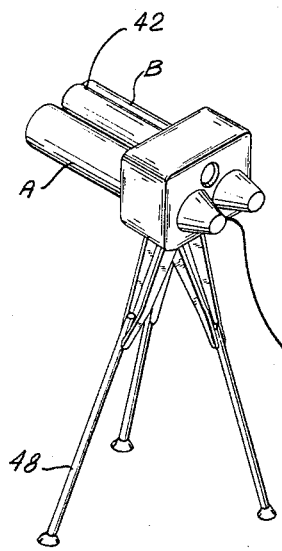
INVENTOR.
ARTHUR L. ROSSOFF
BY James and Franklin
ATTORNEYS April 23, 1968  A. L. ROSSOFF  3,379,827
SYNTHETIC STEREOSCOPIC BINOCULAR
Filed July 26, 1963  6 Sheets-Sheet 4

INVENTOR.
ARTHUR L. ROSSOFF
BY James and Franklin
ATTORNEYS

FIG. 12
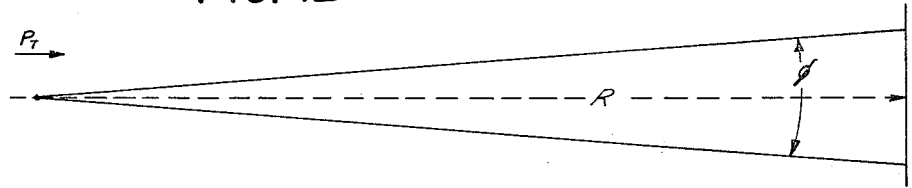
FIG. 13
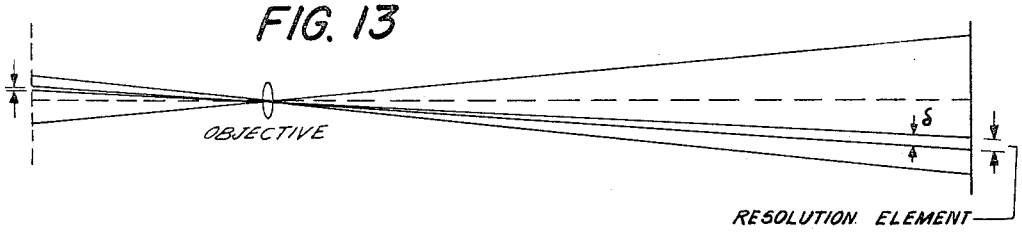
FIG. 14
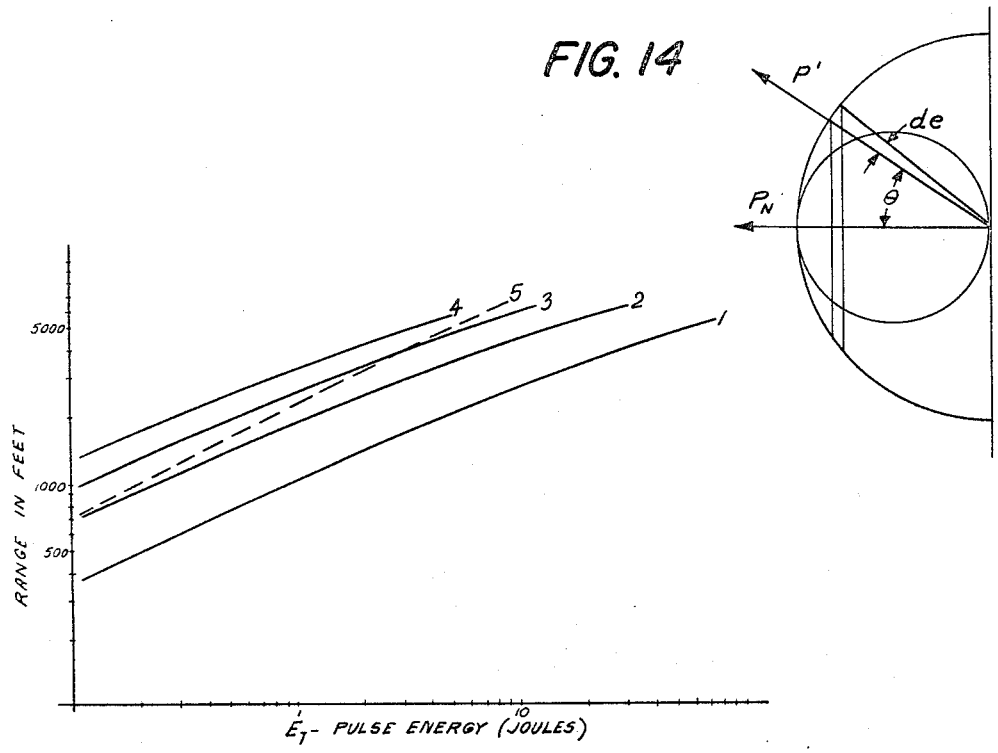
FIG. 15
INVENTOR.
ARTHUR L. ROSSOFF
BY James and Franklin
ATTORNEYS United States Patent Office 3,379,827
Patented Apr. 23, 1968

3,379,827
SYNTHETIC STEREOSCOPIC BINOCULAR
Arthur L. Rossoff, Huntington Station, N.Y., assignor to General Instrument Corporation, Newark, N.J., a corporation of New Jersey
Filed July 26, 1963, Ser. No. 297,864
22 Claims. (Cl. 178—6.5)

This invention relates to stereoscopic binoculars.

The ability of a human being to estimate the distances to and the dimensions of objects, and to orient himself within a spatial environment, is tied principally to two factors: external cues, such as familiarity, shadow, interception, etc.; and binocular parallax, resulting in retinal disparity. Where a field of view contains familiar objects, the dimensions of which are known to some reasonable degree of accuracy, their ranges may be estimated. For example, a view of the ground from an airplane which includes such familiar features as buildings, vehicles, roads, etc., may permit an estimate of altitude and, indirectly, of speed. On the other hand, our ability to estimate the dimensions of a distant cloud is very poor and, as a consequence our ability to use it as a yard stick to estimate its range and the speed of the aircraft is extremely limited. Associated with our inability to judge distances in an unfamiliar environment and to recognize that environment is a phenomenon of personal, spatial disorientation. These conditions will obtain particularly in an extraterrestrial environment, and consequently are a matter of concern for future manned space missions.

At very short ranges, human binocular vision leads to a perception of deph and, with it the ability to judge size. Generally, the range over which human stereoscopic vision is effective is perhaps fifty feet. This range may be extended with the use of binoculars having widely separated objectives. There are practical limitations to the extent to which this may be carried.

The present invention provides a means whereby binocular parallax may be synthesized so that a distant scene may be viewed as though observed from arbitrarily separated points of view. By this means, human perception of depth may be extended synthetically to arbitrary ranges, limited only by sensitivity of the apparatus.

The general object of the invention is to provide instrumentation by which a synthetic, stereoscopic image of a distant field may be observed, photographed, or televised. Because the stereoscopic quality of the image is synthetic, it may be exaggerated as desired. Thus, depth perception may be extended to arbitrary ranges although the observation is in fact made from one point.

In accordance with a further object of this invention, it provides its own illumination, and therefore may be used for night time viewing. The illumination consists of very brief, intense flashes. In principle, the illumination may be located outside of the visual spectrum to avoid human detection.

A further object is to provide binocular means capable of displaying an overlay of range contours of convenient intervals, thereby providing a quantitative scale for the third dimension. Still another object is to quantitatively indicate the range to a selected or particular point of interest in the field of view. Thus, in a battlefield application, it might be used for day or night surveillance, with the advantage of depth perception not available in conventional telescopic observation, plus the ability to determine the range, for fire control purposes, of a selected target in the field.

For military airborne applications, the invention may be used for night photos or visual observation. It would seem particularly suited for tactical reconnaissance. For extra-terrestrial applications, the apparatus offers the capability of day-night, distant stereoscopy with advantages in terms of depth and scale perception in an unfamiliar environment.

To accomplish the foregoing general objects and other more specific objects which will hereinafter appear, my invention resides in the synthetic stereoscopic binocular elements and their relation one to another, as are hereinafter more particularly described in the following specification. The specification is accompanied by drawings, in which:

FIG. 2 illustrates the binocular portion of the system;

FIG. 3 is explanatory of certain wave forms employed;

FIG. 4 is a perspective view showing one form of combined transmitter and receiver;

FIGS. 12, 13 and 14 are geometric views explanatory of the determination of the useful range of the invention;

FIG. 15 is a graph showing the relation between range and transmitter energy for different aperture diameters for certain assumed values of relevant parameters;

Figure 1:
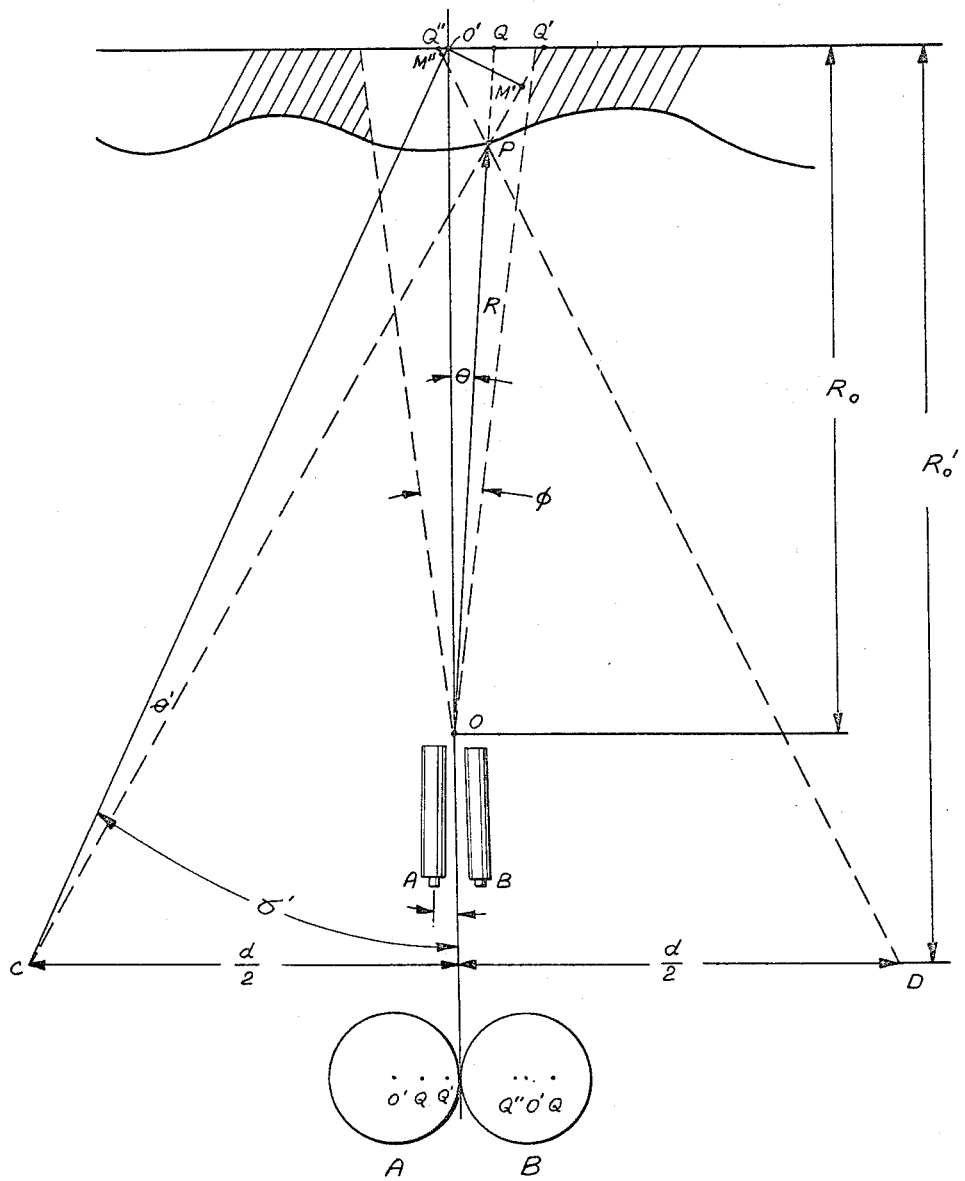
FIG. 1 is a diagrammatic view explanatory of the theory of the invention.

The synthetic stereoscopic binocular consists of two main functional portions, the optical transmitter and the optical receiver, which are analogous to the transmitter and receiver in a radar system. Referring to FIG. 4 of the drawing, the transmitter is represented by the cylinder 42 and the binocular receiver is represented by the cylinders A and B, the assembly in this case being mounted on a tripod 48, and energized from a source 50 through a cable 52. These are described in greater detail later.

The theory of the invention may be described with the aid of FIG. 1. The observer is at O. Here a light source (the details of which will be described subsequently) illuminates an angular field $\phi$ about the normal axis OO'. A point P, lying on the surface of the illuminated terrain, is a typical point for the illustration of the method. The special binoculars, A, B, which view the illuminated scene, are also located at O.

As viewed by A or B, the point P would normally image at a distance to the right of the center of the field proportional to O'Q, as shown in the enlarged circles at the bottom of the diagram. Q is the projection of P on a datum plane as seen from O.

Now, consider an imaginary telescope (monocular) at C, directed toward the illuminated field, and located at arbitrary distances, $R_0'$ from the datum plane and $d/2$ from the normal. From this point of view, the point P is projected to Q' on the datum plane. Its projection on a plane perpendicular to the axis CO' is to point M'. Similarly, a monocular at D would see P projected to M''. If we can alter the images actually seen at A and B so that they resemble those that would be seen at C and D, we would realize a stereoscopic view of the distant scene with an exaggerated inter-ocular spacing of $d$.

To accomplish this purpose, let us see what alteration of the image is required.

The actual projection of P, $$O'Q = R_0 \tan \theta \quad (1)$$

By further trigonometry, $$O'Q' = \frac{d}{2}\left[\frac{R_0 - R\cos\theta}{R_0' - R_0 + R\cos\theta}\right] + \left[\frac{R_0' R \sin\theta}{R_0' - R_0 + R\cos\theta}\right] \quad (2)$$

and $$O'Q'' = \frac{-d}{2}\left[\frac{R_0 - R\cos\theta}{R_0' - R_0 + R\cos\theta}\right] + \left[\frac{R_0' R \sin\theta}{R_0' - R_0 + R\cos\theta}\right]. \quad (3)$$

These equations rigorously describe the necessary image corrections in terms of several constants plus the variable polar coordinates, R and $\phi$, of the point in question. With knowledge of R and $\phi$ for each point on the illuminated surface, the corrections may, in principle, be accomplished. Fortunately, certain simplifications in these equations are possible and lead to simple and novel implementation. First, we assume $$R_0' \gg R_0 - R\cos\theta$$

This means that the points, C and D, are taken very far from the datum plane, compared to the distance of all points on the illuminated surface from that plane. Since $R_0'$ may be chosen arbitrarily, this criterion may readily be satisfied by letting $R_0' \to \infty$. An implication of this constraint is that the illuminated field subtends a negligibly small angle when viewed from C or D. At the same time, the term, $d/2R_0$, is finite and arbitrary.

With this approximation, we may rewrite Equations 2 and 3 as follows:

$$O'Q' = R \sin\theta + \left[\frac{d}{2R_0'}\right](R_0 - R\cos\theta) \quad (5)$$

and $$O'Q'' = R \sin\theta - \left[\frac{d}{2R_0'}\right](R_0 - R\cos\theta) \quad (6)$$

A further approximation is that $\phi$ is small so that $$\sin\theta \approx \tan\theta \quad (7)$$

and $$\cos\theta \approx 1 \quad (8)$$

Then, if the left and right eye corrections, referred to the datum plane, are denoted $\Delta_L$ and $\Delta_R$, respectively, $$\Delta_L = O'Q' - O'Q = \left[\frac{d}{2R_0'}\right](R_0 - R) \quad (9)$$

and $$\Delta_L = O'Q'' - O'Q = \left[\frac{d}{-2R_0'}\right](R_0 - R) \quad (10)$$

The projection of these corrections on the planes perpendicular to the O'C and O'D axes are proportional to the datum plane corrections, for small values of $\phi'$ and $\phi''$. These criteria are implicit in the assumption already made that $R_0' \to \infty$. The proportionality factor is simply $\cos \gamma'$ which, taken with the term $d/2R_0'$ may be referred to as a "stereo factor" S, to be chosen at will.

Then, $$\Delta_L = S(R_0 - R) \quad (11)$$

$$\Delta_R = -S(R_0 - R) \quad (12)$$

To implement corrections 11 and 12, we must find means to deflect all points in the images at A and B, either to the right or to the left, by amounts which are a linear function of the range, R.

To accomplish this, the illumination must consist of a succession of short, intense pulses. The duration of each pulse determines the "range resolution," as in radar. The pulse repetition rate is ideally at least as rapid as will result in imperceptible flicker. A rate of twenty per second satisfies this criterion. It is also necessary that the repetition period be at least as long as the round trip time corresponding to the maximum range interval which the field is likely to encompass. This criterion must be satisfied if ambiguity is to be avoided.

An appropriate light source for this purpose is the laser, which has very high spectral density, a virtue in overcoming the effects of ambient illumination, and is capable of delivering brief, intense pulses. If a laser is used, its normally sharp beamwidth must be optically broadened to provide the desired field angle.

The binoculars are illustrated in FIG. 2. A narrow band optical filter 31 acts to attenuate ambient light while passing the wavelength of the pulsed illumination. Ideally, the filter would "match" the spectral distribution of the illumination. Element 32 is an object lens which, with lens 33, acts to form an erect, real image on the forward face of element 34.

Element 34 is an "image intensifier." In essence, it is a cylindrical device having an input and an output face. An optical image cast on the input face results in an intensified image on the output face. Simply described, the input face is photo-emissive, so that electrons are released at each point on the face in numbers proportional to the intensity of the illumination at that point. The electrons are then accelerated axially and focused on the output face, where they form an electron image. The output face is coated with a phosphor, resulting in an optical image which is, ideally, a facsimile of the input image. This may be viewed with the aid of the eyepiece lens 35. The characteristics of the phosphor are such that its spectral content may be selected wtihin limits and placed within the visual range, independent of the spectrum of the incident image. Also, it has the characteristic of persistence, which may also be selected within limits, so that its image may persist over the period between illumination pulses, even though the pulse duration may be a very small fraction of that period.

The device thus described provides amplified images of the illuminated field in each eyepiece. These would be essentially identical, and would provide no useful stereoscopy. To accomplish the latter, we must alter the images by selective left or right deflections proportional to $\Delta_L$. These deflections may be accomplished by the application of an electric field in the electron drift space at 34, in a horizontal direction perpendicular to the optical axis. Alternatively, it may be accomplished by applying a magnetic field in a vertical direction. Either will produce a sideward deflection, and the fields are made opposite in sense, although energized from a single source.

The waveforms of the deflection signals are given by Equations 11 and 12, where it will be noted that R, the range to the point in question, is proportional to time measured from each successive illumination pulse. Accordingly, $\Delta_L$, as shown in FIG. 3, consists of a D-C term, $SR_0$, plus a negative sawtooth which starts simultaneously with each illumination pulse, having a slope which is adjustable at will to provide the desired degree of parallax. The transmitted pulses are shown at 36 in the top line of FIG. 3, and the sawtooth is shown in the bottom line of FIG. 3. The transmitted pulses are so short that they are shown as a single vertical line. With this deflection waveform applied, optical signals reflected by near points arrive early and suffer large deflection. Signals from more distant points arrive later and are deflected less. The left eye image is deflected to the right, and the right eye image is deflected to the left, by the application of the same waveform but in the opposite direction.

As a practical matter, in order to avoid obscuring the image with light which is back-scattered by the atmosphere (if the application is in an atmospheric environment) the system may be "blanked" at the time of and following each pulse, for a period extending short of the earliest expected return. A gating pulse is shown in the second line of FIG. 3, the received signal being shown in the third line, beneath the gating pulses.

Since the image deflections are proportional to range, the use of a calibrated horizontal scale in the output image plane, thus calibrated controls for the amplitude of the deflecting signals, permits absolute measurement of range to any point in the field of view. This is an additional use to which the system may be applied, although another and preferred system is described later for range finding.

One form of an assembled system is illustrated in FIG. 4. The illumination source is contained in the top central cylinder 42 with appropriate optics to provide the desired angular field. The binoculars A and B are mounted beneath the projector 42, and the assemblage is mounted on a tripod 48. The assemblage is pivoted on the tripod, and all three tubes are aimed in unison. Auxiliary equipment, containing power sources and a deflection signal generator, may be contained in a carrying case 50, and is connected by cable 52 to the optical components.

Figures 5, 6:
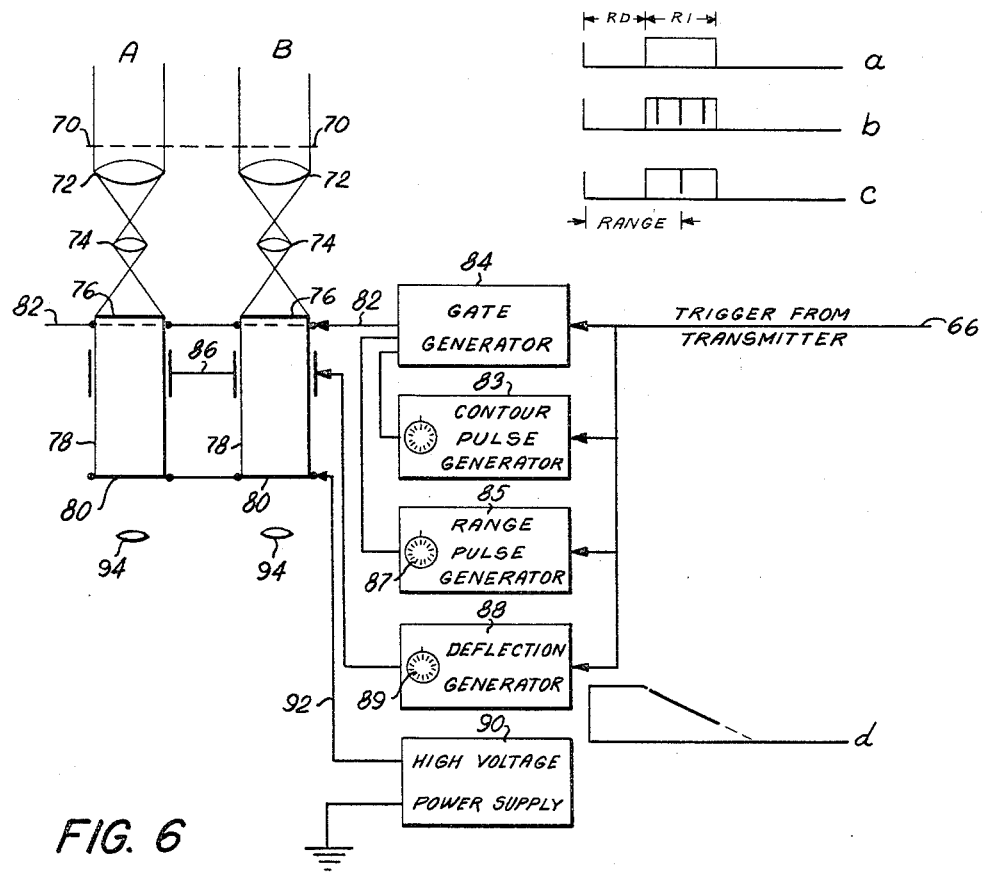
FIG. 5 is a schematic diagram of the transmitter.
FIG. 6 is a schematic diagram of the receiver.

The optical transmitter may be described with reference to FIG. 5. Its purpose is to provide an illumination of a distant scene by means of a very intense pulse of monochromatic light of very brief duration and at a repetition rate which depends upon its application. In FIG. 5, a source of illumination is shown as a laser, which term is generic and is understood in the art to take a variety of forms. In the embodiment shown, which is intended as an example, to which the scope of this patent is not intended to be limited, the laser consists of a ruby rod 52. The rod is pumped by means of a gaseous discharge tube 54, which derives its energy in the form of an intense electrical discharge from a pump power source 56. Conventionally, this source consists of a capacitor bank which is charged to high voltage from a DC power supply, and then is allowed to discharge through the lamp. In certain applications of the synthetic stereoscopic binocular, this process is performed repetitively and is controlled by a simple timing device. In other applications, the lamp may be flashed manually as desired.

Associated with the laser for the purpose of causing luminous output to be highly intense as well as of very short duration, is a device known variously in the art as a "Q-switch" or "Q-Spoiler." This is shown symbolically as a rotating mirror 58 having the function of inhibiting laser action until its angular orientation is precisely normal to the ruby axis.

The luminous output of the laser is normally highly collimated. For this application, we require a divergent beam, for which the angle of divergence may be chosen to suit the application. To accomplish this divergence, a concave lens 60 is shown. Alternatively, appropriately shaped reflective optics could be used for the same purpose. A tiny mirror 62 is so positioned as to intercept a very small portion of the transmitted beam leaving lens 60. This in turn illuminates a photoelectric cell 64, from which is derived an electrical pulse precisely coincident with the light pulse, and which electrical pulse is fed by conductor 66 to trigger various circuits in the optical receiver, next described.

The optical receiver is described with reference to FIG. 6 of the drawings. There are two identical optical assemblies, A and B corresponding respectively to the left and right eye. The description of one applies to both, unless otherwise indicated.

A very narrow band optical filter 70, having a wave band centered at the laser wave length, has the function of suppressing all incident illumination other than that derived from the transmitter. Lenses 72 and 74 serve the function of imaging the distant scene on the front face 76 of the image intensifier 78. Refractive optics are shown, but reflective optics might equally well be employed.

The face 76 is a photo-emissive surface, which gives rise to an electronic image which ultimately impinges on the output face 80, which is phosphorescent. By the internal action of the image intensifier, which is well understood in the art, the image is amplified in intensity, and persists for a longer period of time than the duration of the input illumination. Terminal 82 leads to a grid or control electrode having the function of controlling the electron flow so that it can be turned on or off by proper application of a potential. This electrode is energized by a gate generator 84, which is triggered via conductor 66 from the transmitter, and which delivers one or another of the wave forms shown at a, b, or c as may be selected by appropriate controls on the gate generator and accessory generators 83 and 85.

Waveform a gates the receiver on, at grid 82 at the end of the range delay (RD) period, and holds it on for the range interval (RI). At all other times the receiver is off. This allows the receiver to accept signals originating from a range interval which is of interest, and to suppress all others. Waveform b includes the same gating pulse but superimposes upon it a series of very brief timed periodic pulses from generator 83 which turn the tube off momentarily to indicate discrete, periodic ranges. These timed pulses result in the appearance of black lines corresponding to ranges, which may be called "range contours." The interval between successive contour pulses may be manually set as desired. Waveform c also includes the basic gating pulse of waveform a but has in addition a single range marker pulse, generated by generator 85, which turns the tube off briefly for the range to which the pulse corresponds. The timing of this pulse is continuously variable by means of a calibrated dial control 87, making it possible for a measurement to be made of the absolute range to any selected point of interest in the observed field, by simply setting the range marker until it intersects that point, and then reading the range on the calibrated dial which moves the pulse.

The electrodes at 86 represent a means for producing a lateral deflection of the image. The deflection means may be either electrostatic or magnetic. The same deflection signal is applied to terminals 86 of both tubes, but in reversed sense, so that a right hand deflection on the left optical tube A is accompanied by a left hand deflection on the right optical tube B. The deflection signal is derived from the deflection generator 88, which is also triggered by the trigger pulse from the transmitter. The deflection waveform is shown at d, where it is seen to be approximately linear for the gated period of interest. Its slope is manually adjustable by a control 89 in order to thereby control the degree of synthetic stereoscopic exaggeration. Its intercept also is manually adjustable in order to determine the range for which the lateral deflection is zero.

A high voltage power supply 90 provides accelerating potential to wire 92 and surface 80. This is merely a symbolic and greatly simplified representation. In practice a number of accelerating potentials are applied to a multiplicity of electrodes along the length of the receiver tube in order to satisfy the detailed requirements for its proper operation.

The resultant image, intensified, blanked or gated, and deflected, appears on the output face 80, where it may be viewed with the aid of an eyepiece 94, or the two faces may be photographed or televised. Alternatively, the receiving system may consist of but one receiver tube, rather than a pair, with means for sequentially viewing left and right eye displays.

Figure 8:
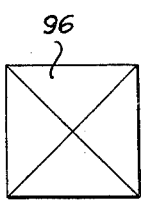
FIG. 8 shows the object and its optical image when not distorted for stereoscopic effect.
Figure 7:
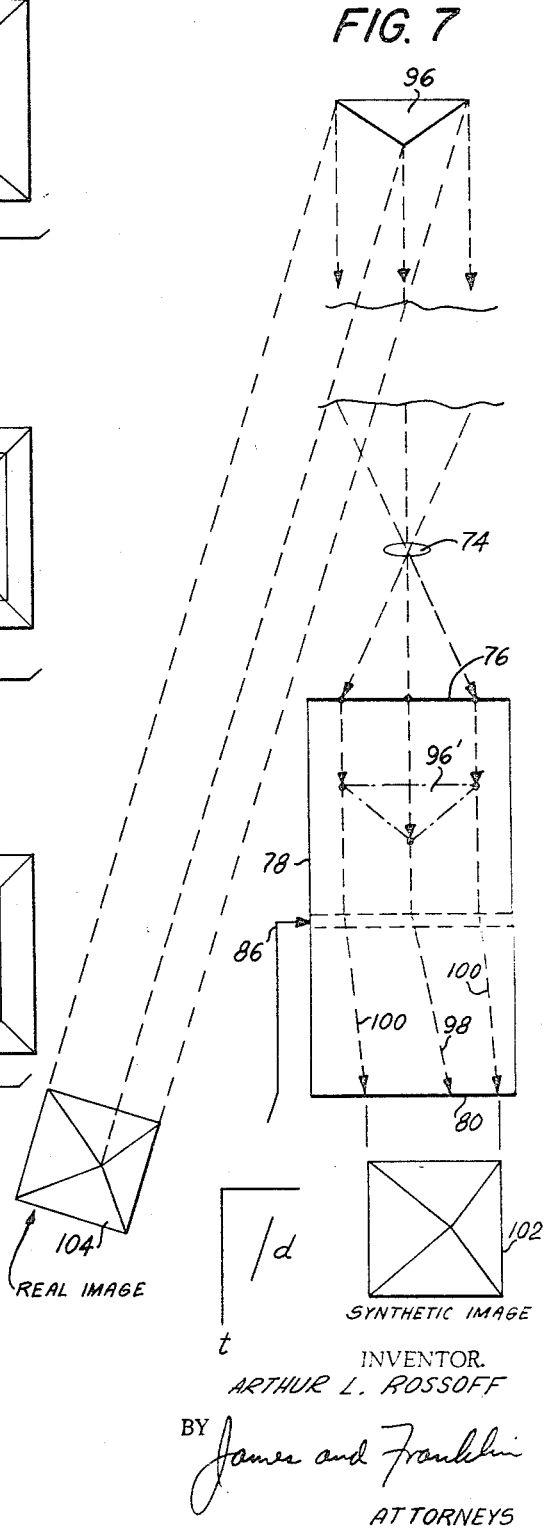
FIG. 7 is explanatory of the synthetic stereoscopic feature.

FIG. 7 is a more pictorial representation than has previously been presented, and should assist in understanding the operation. The distant object being viewed is here assumed to be a pyramid 96 as seen from a point directly above it. If viewed with ordinary optics, it would appear as shown in FIG. 8, and its image on the input face of the image intensifier actually has that same form. The optical image is transformed into an electronic image which travels rapidly down the tube 78 until it strikes the output face 80. There it gives rise to another optical image as a result of the excitation of phosphors. In the process, three important things happen. First, the electron image is very greatly intensified as a result of successive secondary emission. The mechanics of this known process are not shown, as they would greatly complicate this disclosure. Secondly, the output image is given long persistence, which allows it to be viewed for a much longer period of time than the brief pulse duration of the input image.

Returning to what happens in the tube 78, the input image results from a very brief flash of illumination. Consequently, the image of the apex of the pyramid arrives earlier than the image of its base. Accordingly, the electrons emitted from the point at which the apex images, start down the tube 78 earlier than those emitted from the points corresponding to the image of the base. If we could freeze the motion of the electrons and view them in space, they would, in fact, be distributed as shown in broken lines at 96′, constituting a spatial image of the pyramid.

Now, the third important thing happens when a transverse deflecting field is applied at an appropriate point, say zone 86, along the axis of the tube 78. This results in a left-right shift of the image. If the field is constant (in time), the image is undistorted and the shift is similar to that brought about by the centering controls on a conventional cathode ray display. However, if the deflecting field is time-varying and, in particular, is a linear function with a negative slope, as shown at $d$ in FIG. 6, or at $d$ in FIG. 7, it will have the effect of deflecting the electrons corresponding to the apex of the cylinder more than those of the base. Thus path 98 is deflected more than path 100. As a result, the image is distorted in a deliberate manner, resulting in the picture 102 labelled "synthetic image." Notice that this resembles the picture 104 labelled "real image," which is the image seen from a point of view displaced far to the left.

By reversing the direction of the field, a "synthetic right eye image" may also be produced. If these are viewed by the two eyes, the pyramid emerges from the image plane with the illusion of depth. The degree of depth perception or the "exaggeration" is dependent upon the slope of the deflecting signal. When this goes to zero, both eyes see the same image and stereoscopy is lost.

Figure 9:
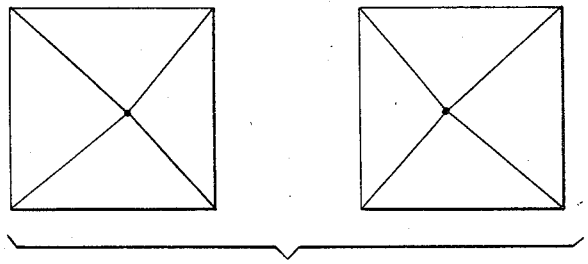
FIG. 9 shows the object of FIG. 8 distorted for stereoscopic effect.

In FIG. 9, a stereoscopic representation of a pyramid has been graphically constructed in the manner seen through the present device. This if recorded may be viewed by means of a stereoscope. Photo-interpreters and others practiced in the art of stereo viewing, will be able to interpret without optical aids such as a stereoscope.

Figure 10:
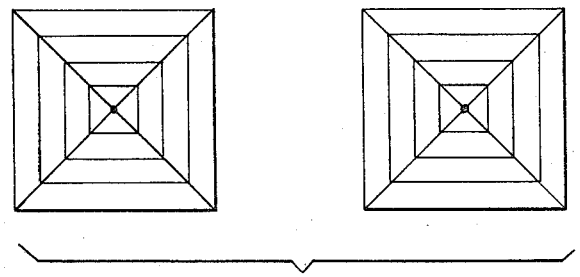
FIG. 10 shows the object of FIG. 8 with superposed contour range lines.
Figure 11:
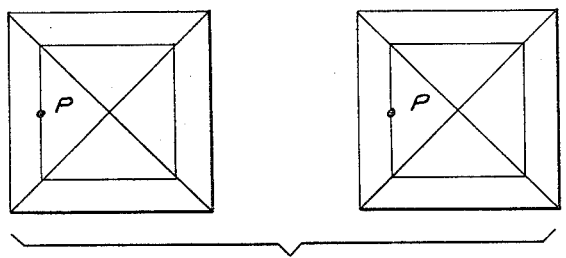
FIG. 11 shows the object of FIG. 8 with a range line applied to a selected target.

FIGS. 9, 10 and 11 show simple representations of displays which would be derived under the various modes of operation. In all cases, the simple goemetric shape of a right square pyramid has been chosen as the distant scene. This is the pyramid shown at the top of FIG. 7 and in FIG. 8. In FIG. 9 the pyramid is seen in the stereoscopic mode by use of the waveforms $a$ and $d$ of FIG. 6 (or those shown in FIG. 3), where it is to be noted that the apex of the pyramid is displaced to the right in the left eye display, and to the left in the right eye display. A transverse deflection signal is applied during the range interval. Its presence and waveform outside of that interval are of no importance. The degree of synthetic stereo or "exaggeration" is proportional to the slope of the waveform, which preferably is made a manual adjustment. The intercept ($R_0$) in FIG. 3 represents a D.C. or centering adjustment which establishes the range at which the transverse deflection goes to zero.

In FIG. 10 stereoscopy has been turned off by reducing the waveform $d$ (FIG. 6) to zero, and as a result the left and right eye displays are identical, but have painted on them range contour lines which are produced by application of the waveform $b$ of FIG. 6. This is accomplished quite simply by applying the said modified gating signal to the image intensifier to turn it off very very briefly at appropriate range intervals. Regions corresponding to discrete, periodic ranges then appear as black lines. This mode of operation may be used instead of the stereo mode to convey the third dimension by contour lines. Alternatively, the two modes may be employed simultaneously, in which case the field is seen stereoscopically and with contour lines. It then is possible to perceive qualitatively the height of a mountain or the depth of a valley, and simultaneously to measure those dimensions and to estimate slope by noting the number and density of the contour lines.

For such contouring, very brief periodic blanking pulses are added within the utilized range interval. Their spacing establishes the "contour interval," which may have any desired value, for example, 100 feet.

The contour lines in FIG. 10 are shown as straight lines, although in actuality they are arcs resulting from the intersection of the planar sides of the pyramid with the spherical surface corresponding to constant range. However, because the field angle is very small, the arcs approach straight lines.

In FIG. 11, waveform $c$ of FIG. 6 has been applied, resulting in a single contour line which is used as a range marker. The marker is shifted by a calibrated control dial 87 until it intersects some point of interest P, in order to determine its range. Thus, to determine the absolute range to any point in the field, a sliding "range marker," identical to a single contour blanking pulse, is manually adjusted until its resulting line passes through the point of interest. The range then may be read on the calibrated range marker dial to any convenient scale.

If desired, the ranging mode may be used in connection with the contouring mode, to permit the contours to be tagged with absolute range values, so that the entire field may be said to be mapped in three dimensions. Thus, although FIGS. 10 and 11 have been shown without stereoscopy, mode $a$ may be used simultaneously with mode $b$ or mode $c$, in which case the contour lines of FIG. 10 or the range line of FIG. 11 appears on the synthetic stereoscopic pair shown in FIG. 9. In brief, three modes of operation are possible, and these may be employed singly or simultaneously.

In all modes of operation, it is necessary to make proper adjustment of blanking or gating intervals in order to minimize the effects of atmospherically scattered light, as well as of ambient illumination. Early blanking minimizes both, and is controlled by a "Range Delay" manual adjustment which turns the image intensifier on to accept the earliest desired return. This is shown at R.D. in FIG. 6. The "Range Interval" control then turns it off at a time corresponding to the maximum range of interest. It remains off until the next frame. This is shown at R.I. in FIG. 6. Early and late blanking are required if there is ambient illumination. In darkness, early blanking is required only in an atmospheric environment. Thus, in the lunar night, neither would be required.

Range analysis and other quantitative considerations are next considered. A range equation may be developed as follows:

A transmitted optical pulse of peak power, $P_T$, confined uniformly to the conical angle, $\phi$, illuminates a surface normally at range, R, as shown in FIG. 12. The illumination is reflected hemispherically with a Lambert (cosine law) distribution. If the surface reflectivity is denoted by $\sigma$, the total reflected power is $\sigma P_T$.

The illuminated field is imaged as shown in FIG. 13. I base my analysis on the realization of an angular resolution, $\delta$, at maximum range, and concern for the level of intensity in the area within the small angle $\delta$.

The total power reflected from this elementary area in the object plane, is $$P_2 = \sigma \, P_T \delta^2 / \phi^2 \qquad (1)$$

To determine $P_N$, the power density per unit solid angle reflected normally, I integrate the reflected power density P, over a unit hemisphere and equate to $P_2$ (see FIG. 14). Thus, $$P_2 = \sigma P_T \delta^2 / \phi^2 = \int_0^{\pi/2} (P_N \cos\theta)(2\pi \sin\theta) d\theta \quad (2)$$

$$= 2\pi P_N \left[ -\frac{\cos^2\theta}{2} \right]_0^{\pi/2} = \pi P_N \quad (3)$$

Then, $$P_N = \frac{\sigma P_T \delta^2}{\pi \phi^2} \quad (4)$$

The power per resolution element $P_R$, in the image plane is $P_N$ times the solid angle intercepted by the effective receiving aperture, $A$. Thus, $$P_R = \frac{AP_N}{R^2} = \frac{P_T}{R^2} \left(\frac{\sigma A}{\pi}\right)\left(\frac{\delta^2}{\phi^2}\right) \quad (5)$$

If the total energy per pulse is denoted $E_R$, the number of impinging photons is $E_R/hf$ and, if the quantum efficiency of the photoelectric surface is $q$, the average number of emitted electrons from the elementary area, $$M = \frac{qE_R}{hf} = \frac{E_T}{R^2}\left(\frac{\sigma q A}{\pi h f}\right)\frac{\delta^2}{\phi^2} \quad (6)$$

The number of electrons emited by the first photocathode in a single pulse follows a Poisson distribution, for which the RMS fluctuation in the total number equals the square root of the mean total. If there is no background noise, other than that associated with the signal fluctuation, $S/N = \sqrt{M}$. The question of other sources of background noise is considered later.

I will consider that the useful range is governed by the quantum noise level and define $S/N = \sqrt{M}$. Then, $$(S/N)^2 = \frac{E_T}{R^2}\left(\frac{\sigma q A}{\pi h f}\right)\left(\frac{\delta^2}{\phi^2}\right) \quad (7)$$

An additional factor, not yet considered, is atmospheric attenuation (scattering). If this is denoted, $\propto$, we have $$(S/N)^2 = \frac{E_T}{R^2}\left(\frac{\sigma q A}{\pi h f}\right)\left(\frac{\delta^2}{\phi^2}\right) \epsilon^{-2\propto R} \quad (8)$$

A more useful arrangement of this equation follows:

$$E_T A = (S/N)^2 \left(\frac{\phi}{\delta}\right)^2 \left(\frac{\pi h f}{\sigma q}\right) R^2 \epsilon^{2\propto R} \quad (9)$$

Let us assume the following values:

$S/N = 10$
$\phi/\delta = 10^3$ (this assumes 1000 TV lines on the diameter)
$h = 6.62 \times 10^{-34}$ joule-sec.
$f = 4 \times 10^{14}$/sec. (red ruby line—6943A.)
$\sigma = 0.1$
$q = .02$ (S-20 photocathode at 6943A.)
$\propto = 10^{-4}$/ft. for clear to light haze. This figure is obtainable from G. P. Kniper, "The Atmospheres of the Earth and Planets," Revised Edition, Univ. of Chicago Press, P. 52 (1952).

Then, $$E_T A \approx 4 \times 10^{-8} R^2 \epsilon^{2R \times 10^{-4}} \quad (10)$$

This range equation may be interpreted as follows: It has been evaluated for various ranges in feet up to 5000 feet, and for various receiving aperture effective diameters. These data are plotted in FIG. 15 specifically for 3", 6", 9" and 12" diameters. Also curve 5 in FIG. 15 is for the non-atmospheric case using a 6-inch aperture.

These curves and Equation 9 display the impact of the various perameters upon required energy and aperture. Parameters such as $\sigma$ (reflection coefficient) and $q$ (quantume efficiency) are essentially fixed, representing, respectively, the properties of the terrain and the state of the art for photocathodes. In principle, the frequency is subject to some choice. However, in the present state of the art, high energy laser output is most readily available at 6943 A. The atmospheric attenuation ($\propto$) is a function of atmospheric conditions. The value of $10^{-4}$/ft. is a representative, though somewhat arbitrary choice. The choice of 10 for $S/N$ probably represents an acceptable minimum.

The ratio, $\delta/\phi$ is a measure of the desired resolution or lines per field at maximum range. This is a subtlety which may require some explanation. The resolution, under strong signal conditions, is governed by the receiving optics and the image intensifier, and can be no better than those components allow. A figure of 1000 lines is conservatively representative of what can be achieved in the present state of the art. For example, one commercially available product offers 1700 lines in a 22-mm. screen. Another available image intensifier offers 5000 lines in a 4-inch screen. Associated optics will degrade this resolution somewhat, supporting a choice of 1000 lines as conservative. The light level influences the resolution insofar as it determines the signal-to-noise ratio associated with the integrated illumination of each resolution element on the photocathode. If that $S/N$ ratio is low, it will degrade the optical resolution of the system and thereby govern. If it is high, the resolution asymptotically approaches that of the optics. Note that the term $\delta/\phi$ appears as a square in Equation 9. Thus, if 500 lines were acceptable, the required $E_T A$ would be diminished by a factor of four.

To relate the results of FIG. 15 to available hardware, consider, for example a standard, commercially available air-cooled laser with an output of 0.4 joule/pulse. The laser has provision for Q-switching. Entering this figure on the chart, we note an available range, for example, of 1700 feet for a 9-inch aperture, or 2200 feet for a 12-inch aperture. Laser energy considerably in excess of 0.4 joule is available, though not standard, and would require more extensive cooling.

Note that the angle of field, $\phi$, appears in Equation 9 as a square in the numerator, so that angle of field may be traded for energy. If such a trade is made, the angular resolution at marginal range is retained, although the number of resolution lines per field is altered. On the other hand, increased angle of field may be realized at no cost in energy if the ratio, $\phi/\delta$, is kept constant. Under these circumstances, the total number of resolution lines per field at marginal range is constant, but the angular resolution at that range suffers to the extent that $\phi$ is increased. An increase in $\phi$ influences the validity of the stereoscopic synthesis, as discussed above. This effect is subjective.

To get a quantitative appreciation for this matter, consider a 10° field and assume that the $E_T A$ product has been selected to provide a 1000-line field at a range of 1000 feet. Then, $\delta$ is .01° and the resolution at the 1000-foot range is 1000 $\delta$ (with $\delta$ expresed in radians) or 2.1 inches. Then, with the same $E_T A$ product, the field could be doubled at 20° with a resultant resolution of 4.2 inches. Alternatively, with a 10° field and a 500-line picture, the $E_T A$ product could be reduced by a factor of 4 with a 4.2 inch resolution at the marginal range.

In addition to the noise associated with the quantum value of the signal itself, there are two additional possible sources of noise. One is back-scatter from the atmosphere. This has importance only when it originates at close range and can be blanked out as pointed out earlier. The system could very well have an adjustable blanking gate, permitting the operator to manually set the gate to blank out everything but the range of interest. This is effective, and this noise source is of no importance in this application.

Another potential source of noise is the illumination of the field by ambient sunlight. The total incident ambient illumination in the field of view is:

$$P_a \approx SR^2\phi^2 \text{ in watts/A.}$$

where $S \approx 10^{-2}$ watts/ft.$^2$/A. (at 6900 A.), according to "Handbook of Geophysics," ARDC, USAF, pp. 16–19, 1957. The energy associated with that illumination is PT, where T is the time per frame that the receiver is unblanked. Assuming the range interval of interest to be 500 feet, $T=1$ microsecond. Assume, also, a field ($\phi$) of 10° or .17 radian. Further, let us assume an optical filter with a bandwith, B of 3A. Then, $$E_a \approx BSTR^2\phi^2 = R^2 \times 10^{-9} \text{ joules}$$

Consider for a limiting condition, that $E_a < .1E_T$. Then $E_T > R^2 10^{-8}$. Entering this condition on FIG. 8, it is clear that the criterion is satisfied for all cases considered.

Accordingly, quantum noise governs even in sunlight.

Figure 16:
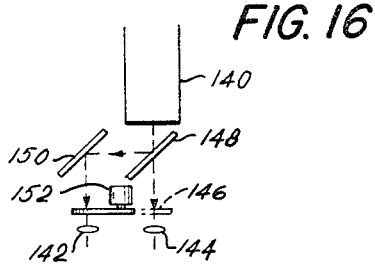
FIGS. 16–18 are explanatory of a stereo system which requires only a single receiving tube for two eyepieces.
Figure 17:
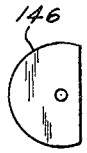
Figure 18:
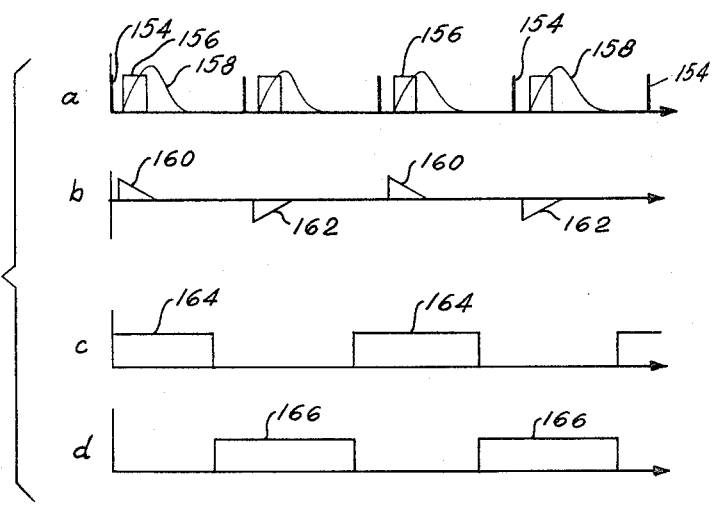

FIGS. 16, 17, and 18 show a means whereby a single optical receiver tube may be used to provide stereo viewing. The principle is to present left and right eye views in rapid sequence, so that they appear to be simultaneous through persistence of vision. The output of a single image intensifier 140 is supplied optically to two spaced eyepieces 142 and 144. The deflection field across intensifier 140 is periodically reversed in sense at a rapid rate, and a shuter means 146 so operates in synchronism with the said reversal of the deflection field that the left eyepiece 142 is operative when the deflection is to the right, and the right eyepiece 144 is operative when the deflection is to the left. Thus a person using the eyepieces 142, 144 of the binocular sees a stereoscopic image.

The single image intensifier 140 may the same as that described previously. A 50% mirror 148 is interposed at a 45° angle in front of the screen. A fully reflecting mirror 150 is arranged as shown, so that left and right eye views are simultaneously provided via eyepieces 142 and 144. The shutter 146 provides sequential viewing. In simplest form it could be a somewhat more than half disc, as shown in FIG. 17, but it may consist of a circular disc with a pattern of apertures so arranged as to cause the two displays to be alternately blocked. A motor 152 drives the shutter disc 146 at appropriate speed to synchronize the action of the shutter to that of the rest of the system.

Such synchronization may be accomplished in a variety of ways. One way is to provide an optical synchronization track on the edge of the disc, consisting of a lamp and a photocell, providing an electrical signal at appropriate disc positions which, in turn, may be used to initiate the laser flash.

Referring to FIG. 18, the timing of events is shown in the time plots a, b, c and d. In graph a the spike 154 represents the laser flash. The wave 156 shows the interval during which the receiver is gated on, corresponding to the range of interest. The wave 158 depicts the phosphor brightness, which reaches a peak at the end of the gate period, and then decays in accordance with the characteristics of the phosphor.

In curve b I show the deflecting signal, which is a declining sawtooth, as before, but which alternates in polarity, as shown by successive cycles 160, 162 etc.

Graph c shows the intermittent periods 164 during which the left eye view is active. Its timing is not critical. It must simply embrace the period during which the screen is luminous with the left eye image. Graph d shows the same for the right eye, which is effective during the periods 166.

Figure 19:
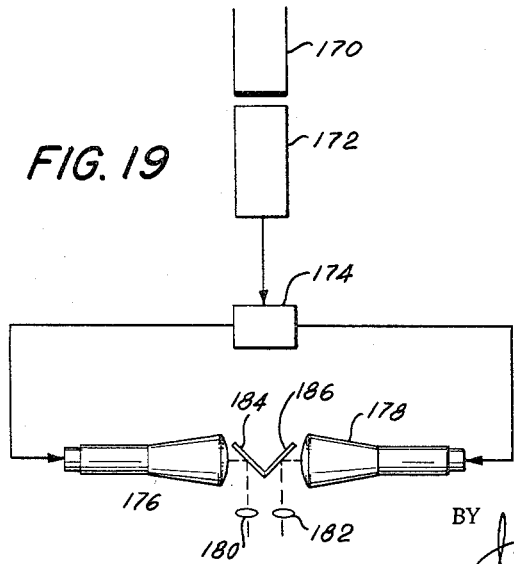
FIG. 19 shows a system using a single receiving tube and two television display tubes.

In FIG. 19, I show a television viewing system embodying the same principle. A single image intensifier 170 is scanned by a television camera 172, and the output of the camera 172 is supplied intermittently through switch means 174 to two television display screens 176 and 178 arranged for simultaneous viewing by left and right eyes at eyepieces 180 and 182. As before, the deflection field of the image intensifier 170 is periodically reversed in sense at a rapid rate, and the switch means 174 so operates in synchronism with the said reversal of the deflection field that the left television tube 176 is operative when the deflection is to the right, and the right television tube 178 is operative when the deflection is to the left.

The television camera 172 accomplishes a complete scan in the period during which the output screen of intensifier 170 is luminous. The video signal is then fed to the electronic switch 174 which has a function similar to that of the shutter in FIG. 16; namely, to energize the two displays in alternation. The tubes 176 and 178 are conveniently disposed end to end, in which case they are viewed via mirrors 184, 186 and eyepieces 180 and 182. Other viewing arrangements may be employed.

It is believed that the construction and theory, as well as the method of use of my improved three dimensional imaging apparatus or stereoscopic binocular, as well as the advantages thereof will be apparent from the foregoing detailed description. It will also be apparent that while I have shown and described the invention in a preferred form, changes may be made without departing from the scope of the invention as sought to be defined in the following claims.

I claim:

1. A synthetic stereoscopic binocular comprising means to transmit a pulsed beam of wave energy, and a receiver for wave energy reflected from the observed scene, said receiver including an image intensifier to receive the image on its input face and to reproduce it on its output face, means to produce a field between the input and the output faces and transverse to the axis of the image intensifier, which field serves to deflect the electrons moving through the image intensifier, and means to so vary the field strength in synchronism with the transmitted pulses that the amount of deflection varies in inverse sense to the distance of the parts of the viewed scene from the receiver.

2. Apparatus as defined in claim 1, in which the image intensifier is provided with a gate electrode energized by a gate generator which is trigged by the transmitted pulses, said gate serving to open the receiver for the useful intervals during which reflection from a desired scene would be received.

3. Apparatus as defined in claim 1, in which the field producing means between the input and output faces of the image intensifier is energized by a deflection wave generator, and in which the deflection wave is an inverse sawtooth wave, and in which the deflection generator is triggered by the transmitter pulses.

4. Apparatus as defined in claim 1, in which the image intensifier is provided with a gate electrode energized by a gate generator which is triggered by the transmitted pulses, said gate serving to open the receiver for useful intervals during which reflection from a desired scene would be received, means to modify the said gate wave by timed periodic spaced contour pulses which close the gate momentarily, whereby the timed pulses produce dark lines which act as range contour lines.

5. Apparatus as defined in claim 1, in which the image intensifier is provided with a gate electrode energized by a gate generator which is triggered by the transmitted pulses, said gate serving to open the receiver for useful intervals during which reflection from a desired scene would be received, means to modify the said gate wave by a single range marker pulse which closes the gate momentarily, generator means to produce the said marker pulse, said generator means including a calibrated dial for shifting the timing of the marker pulse as a measure of range, whereby a dark range line is produced and may be shifted by said dial until it intersects a point of interest in the viewed scene, the calibrated dial then indicating the range of the said point of interest.

6. A binocular as defined in claim 1 in which the output of a single image intensifier is supplied optically to two spaced eyepieces, and in which there are means to periodically reverse the deflection field in sense at a rapid rate, and in which there is an additional means so operated in synchronism with the said reversal of the deflection field that one eyepiece is operative when the deflection is in one direction, and the other eyepiece is operative when the deflection is in the opposite direction.

7. A binocular as defined in claim 1, in which the output of a single image intensifier is scanned by a television camera, and in which there are two television screens arranged for simultaneous viewing by left and right eyes, and a switching means, the output of the camera being supplied alternately through the switch means to the two television screens, and in which there are means to periodically reverse the deflection field of the image intensifier in sense at a rapid rate, and in which the switch means is so operated in synchronism with the said reversal of the deflection field that one television display is operative when the deflection is in one direction, and the other television display is operative when the deflection is in the opposite direction.

8. Apparatus as defined in claim 2, in which the field producing means between the input and output faces of the image intensifier is energized by a deflection wave generator, and in which the deflection wave is an inverse sawtooth wave having a duration approximating the duration of the useful intervals during which the receiver tube is gated open, and in which the deflection generator is triggered by the transmitter pulses along with the gate generator.

9. A synthetic stereoscopic binocular comprising a laser to transmit a pulsed beam of light, and a receiver for light reflected from the observed scene, said receiver including an image intensifier to receive the image on its input face and to reproduce it on its output face, means to produce a field between the input and the output faces and transverse to the axis of the image intensifier, which field serves to deflect the electrons moving through the image intensifier, and means to so vary the field strength in synchronism with the transmitted pulses that the amount of deflection varies in inverse sense to the distance of the parts of the viewed scene from the receiver.

10. Apparatus as defined in claim 9, in which the laser tube and the receiver tube are mounted in collateral relation on a single mounting for simultaneous aiming movement in unison.

11. A binocular as defined in claim 9 in which the output of a single image intensifier is supplied optically to two spaced eyepieces, and in which there are means to periodically reverse the deflection field in sense at a rapid rate, and in which there is a shutter means so operated in synchronism with the said reversal of the deflection field that the left eyepiece is operative when the deflection is to the right, and the right eyepiece is operative when the deflection is to the left, whereby a person using the eyepieces of the binocular sees a stereoscopic image.

12. A binocular as defined in claim 9, in which the output of a single image intensifier is scanned by a television camera, and in which there are two television screens, and a switch means, the output of the camera being supplied alternately through the switch means to the two television screens, and in which there are two spaced eyepieces and optical means so arranged that one eyepiece views one television screen and the other views the other television screen, and in which there are means to periodically reverse the deflection field of the image intensifier in sense at a rapid rate, and in which the switch means so operates in synchronism with the said reversal of the deflection field that the left television display is operative when the deflection is to the right and the right television display is operative when the deflection is to the left, whereby a person using the eyepieces of the binocular sees a stereoscopic image.

13. A synthetic stereoscopic binocular comprising a laser to transmit a pulsed beam of light, and a receiver for light reflected from the observed scene, said receiver including an image intensifier to receive the image on its input face and to reproduce it on its output face, means causing the reproduced image to be intensified and increased in duration or persistence by the image intensifier, means to produce a field between the input and the output faces and transverse to the axis of the image intensifier, which field serves to deflect the electrons moving through the image intensifier, and means to so vary the field strength in synchronism with the transmitted pulses that the amount of deflection varies in inverse sense to the distance of the parts of the viewed scene from the receiver.

14. A synthetic stereoscopic binocular comprising means to transmit a pulsed beam of wave energy, and a receiver for wave energy reflected from the observed scene, said receiver comprising a pair of binocular tubes, each tube including an image intensifier to receive the image on its input face and to reproduce it on its output face, means to produce a field between the input and output faces and transverse to the axis of the image intensifier, which field serves to deflect the electrons moving through the image intensifier, means to so vary the field strength in synchronism with the transmitter pulses that the amount of deflection varies in inverse sense to the distance of the parts of the viewed scene from the receiver, the field applied to one binocular tube being opposite in sense to that applied to the other so that image distortion to the left in one tube is accompanied by image distortion to the right in the other, thereby producing the desired stereoscopic effect.

15. A synthetic stereoscopic binocular comprising a laser to transmit a pulsed beam of light, and a receiver for light reflected from the observed scene, said receiver comprising a pair of binocular tubes, each tube including an image intensifier to receive the image on its input face and to reproduce it on its output face, means to produce a field between the input and output faces and transverse to the axis of the image intensifier, which field serves to deflect the electrons moving through the image intensifier, means to so vary the field strength in synchronism with the transmitted pulses that the amount of deflection varies in inverse sense to the distance of the parts of the viewed scene from the receiver, the field applied to one binocular tube being opposite in sense to that applied to the other so that image distortion to the left in one tube is accompanied by image distortion to the right in the other, thereby producing the desired stereoscopic effect.

16. Apparatus as defined in claim 15, in which the laser tube and the binocular receiver tubes are all mounted in collateral relation on a single mounting for simultaneous aiming movement in unison, and in which the receiver tubes terminate in eye pieces appropriately spaced for human viewing.

17. Apparatus as defined in claim 15, in which the field producing means between the input and output faces of the image intensifiers are energized by a deflection wave generator, and in which the deflection wave is an inverse sawtooth wave, and in which the deflection generator is triggered by the laser pulses.

18. Apparatus as defined in claim 15, in which the image intensifiers are provided with gate electrodes energized by a gate generator which is triggered by the laser pulses, said gate serving to open the receiver for useful intervals during which reflection from a desired scene would be received, means to modify the said gate wave by timed periodic spaced contour pulses which close the gate momentarily, whereby the timed pulses produce dark lines which act as range contour lines.

19. Apparatus as defined in claim 15, in which the image intensifiers are provided with gate electrodes energized by a gate generator which is triggered by the laser pulses, said gate serving to open the receiver for useful intervals during which reflection from a desired scene would be received, means to modify the said gate wave by a single range marker pulse which closes the gate momentarily, generator means to produce the said marker pulse, said generator means including a calibrated dial for shifting the timing of the marker pulse as a measure of range, whereby a dark range line is produced and may be shifted by said dial until it intersects a point of interest in the viewed scene, the calibrated dial then indicating the range of the said point of interest.

20. Apparatus as defined in claim 15, in which the image intensifiers are provided with gate electrodes energized by a gate generator which is triggered by the laser pulses, said gate serving to open the receiver for the useful intervals during which reflection from a desired scene would be received.

21. Apparatus as defined in claim 20, in which the field-producing means between the input and output faces of the image intensifiers are energized by a deflection wave generator, and in which the deflection wave is an inverse sawtooth wave having a duration approximating the duration of the useful intervals during which the receiver tubes are gated open, and in which the deflection generator is triggered by the laser pulses along with the gate generator.

22. A synthetic stereoscopic binocular comprising a laser to transmit a pulsed beam of light, and a receiver for light reflected from the observed scene, said receiver comprising a pair of binocular tubes, each tube including an image intensifier to receive the image on its input face and to reproduce it on its output face, means causing the reproduced image to be intensified and increased in duration or persistence, means to produce a field between the input and output faces and transverse to the axis of the image intensifier, which field serves to deflect the electrons moving through the image intensifier, means to so vary the field strength in synchronism with the transmitted pulses that the amount of deflection varies in inverse sense to the distance of the parts of the viewed scene from the receiver, the field applied to one binocular tube being opposite in sense to that applied to the other so that image distortion to the left in one tube is accompanied by image distortion to the right in the other, thereby producing the desired stereoscopic effect.

References Cited

UNITED STATES PATENTS 3,004,464  10/1961  Leighton _____ 178—6.5

ROBERT L. GRIFFIN, *Primary Examiner.*

DAVID G. REDINBOUGH, *Examiner.*

J. A. ORSINO, *Assistant Examiner.*